United States Patent

[11] 3,559,686

| [72] | Inventor | Robert K. Hoffman |
| | | Littleton, Colo. |
| [21] | Appl. No. | 732,406 |
| [22] | Filed | May 27, 1968 |
| [45] | Patented | Feb. 2, 1971 |
| [73] | Assignee | C.A. Norgren Co. |
| | | Littleton, Colo. |
| | | a corporation of Colorado |

[54] FOUR-WAY TWO-POSITION CONTROL VALVE
16 Claims, 6 Drawing Figs.

[52] U.S. Cl. .................................................. 137/625.64, 137/625.26
[51] Int. Cl. ........................................................ F16k 11/07
[50] Field of Search ............................................ 137/596.2, 625.25, 625.26, 625.27, 625.6—625.69; 251/31, 259

[56] References Cited
UNITED STATES PATENTS

| 119,364 | 9/1871 | Jonson ......................... | 137/625.63 |
| 2,157,240 | 5/1939 | Keel .............................. | 251/31X |
| 2,574,096 | 11/1951 | Fischer et al. ................. | 137/625.65 |
| 2,739,613 | 3/1956 | Kulikoff ........................ | 251/359X |
| 2,969,775 | 1/1961 | Thelen ........................... | 137/625.27 |
| 3,199,540 | 8/1965 | Forster ........................... | 137/625.69 |

FOREIGN PATENTS

| 1,042,999 | 11/1958 | Germany ........................ | 137/625.27 |
| 27,121 | 11/1910 | Great Britain ................. | 137/625.27 |

*Primary Examiner*—Henry T. Klinksiek
*Attorney*—Sheridan and Ross

ABSTRACT: System includes primary valve to control air flow to and from ends of servo motor cylinder. Shaft slides axially in bore of valve and has four poppet heads fixed on shaft at appropriate positions. Bore contains two assemblies of two valve seats each, slidable in bore and engaging stops to limit travel. At each extreme of shaft movement one head pushes a seat against its stop and another head pushes a seat away from its stop. Differential air pressure holds second seat against its head. Arrangement eliminates need for extreme accuracy in spacing heads and seats. System also includes pilot valve to control air to and from piston in primary valve which moves poppets. Solenoid armature impact is reduced by spring, air pressure, and seal friction.

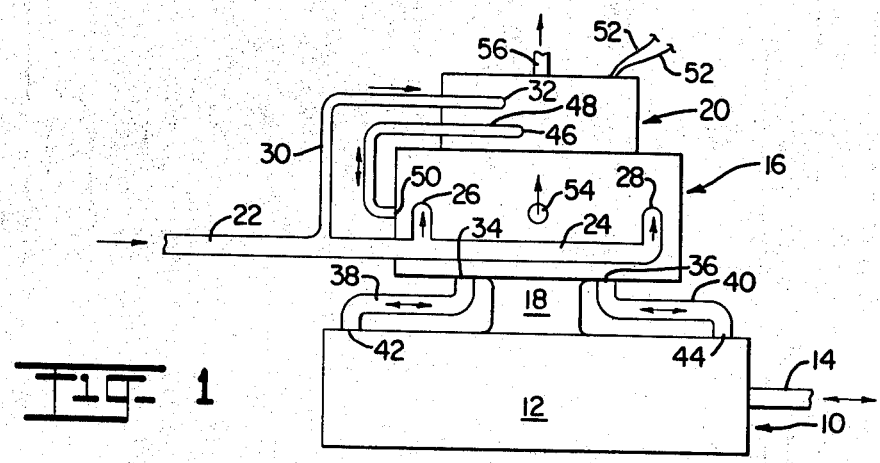
Fig. 1
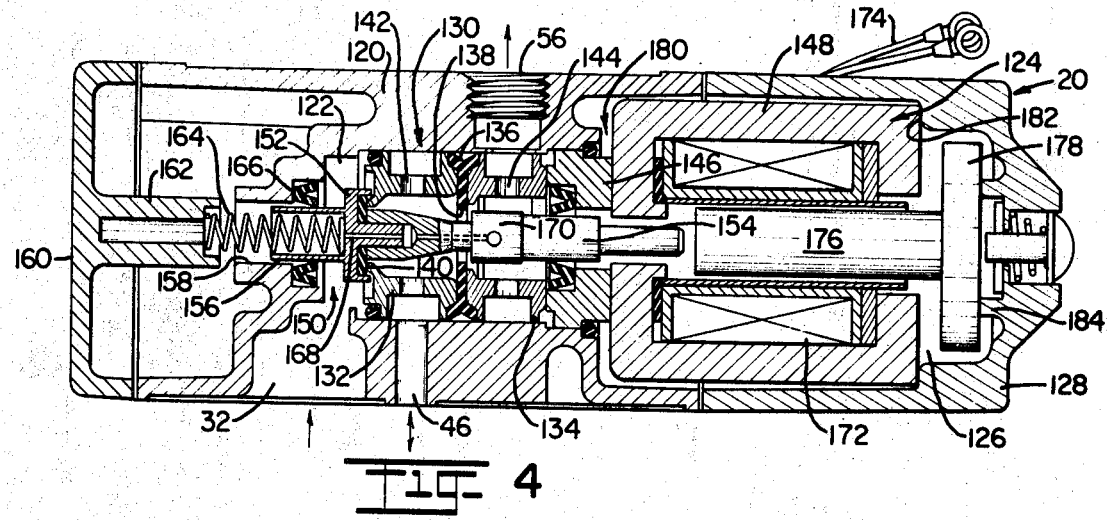
Fig. 4
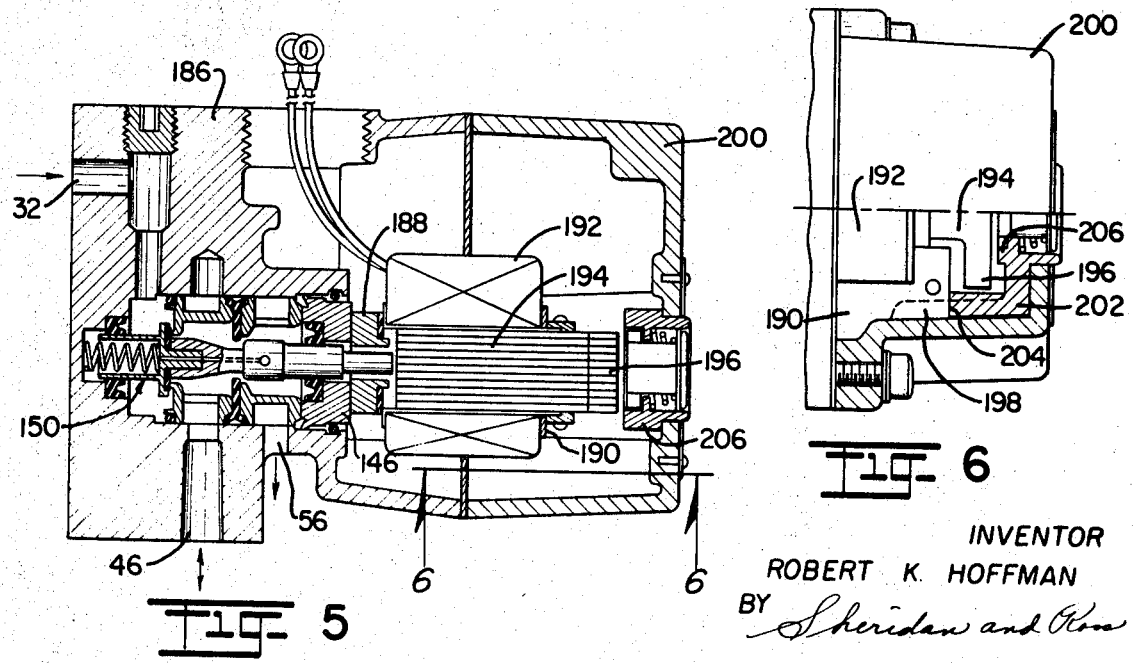
Fig. 5
Fig. 6
INVENTOR
ROBERT K. HOFFMAN
BY Sheridan and Ross
ATTORNEYS

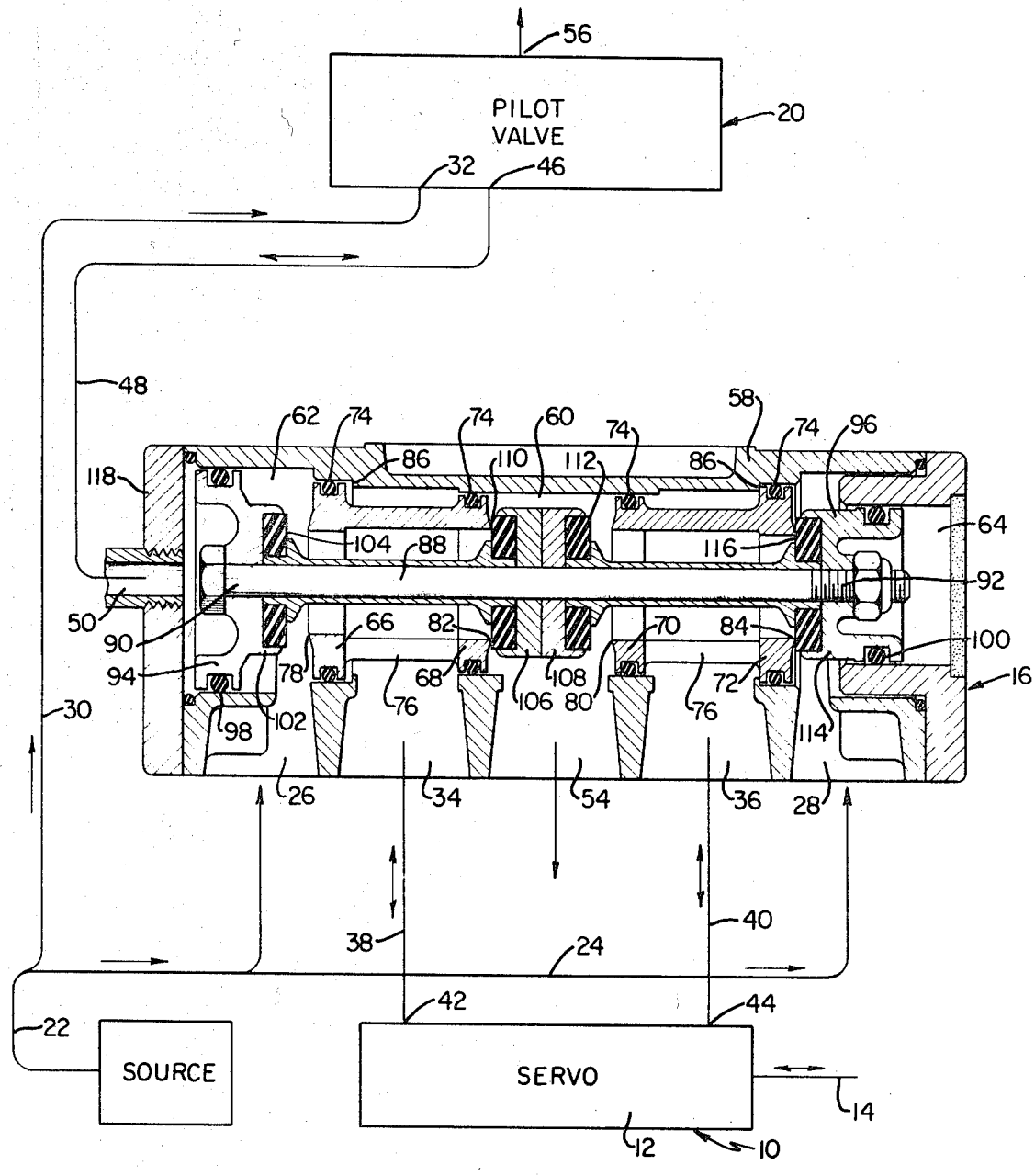

3,559,686

FOUR-WAY TWO-POSITION CONTROL VALVE

BACKGROUND OF THE INVENTION

This invention lies in the field of remotely operated control systems for servo motors and like devices and relates to valve systems which are initially controlled electrically from any distance to control air flow to and from the ends of servo motor cylinders. It is directed more particularly to an assembly comprising a primary valve which directly controls the servo motor and is designed to eliminate the problem of extreme dimensional accuracy in manufacturing, and a pilot valve which controls air flow to and from the primary valve to actuate it in opposite senses, the pilot valve being designed to greatly reduce the impact forces of the solenoid and thus extend the life of the pilot valve.

Two general types of primary valves are commonly used to provide four way air control for servo motors. One type is known as a spool valve and usually includes a cylinder having an elongate bore with lateral inlet, outlet, and exhaust parts, a shaft axially movable in the bore, and cylindrical enlargements or bosses on the shaft overlying various ports in different longitudinal positions to control the air flow as desired. To prevent leakage, these bosses are often provided with elastomeric seals such as O-rings, which slidingly engage the wall of the bore, and these seals tend to wear rapidly because they must pass over the edges of the ports.

To overcome this difficulty, a generally similar valve is provided with valve seats extending radially inward from the wall of the bore between the ports, and the shaft is provided with poppet heads fixed on the shaft and arranged to engage selected valve seats at the extremes of movement of the shaft. The heads normally are provided with ring-like gaskets to engage the seats. While this type of valve is very good, it has a serious drawback. For operation in each axial direction the seals of two poppet heads must engage two valve seats at the same time. Therefore the two poppet heads must be exactly the same distance apart as their two respective valve seats unless the gaskets are so yieldable that they are quite unsatisfactory in service. The required accuracy is so great that normal manufacturing tolerances are unacceptable, and the cost of making such valves is undesirably increased.

Solenoid operated valves of both spool and poppet type are used extensively for both primary and secondary or pilot control. The solenoid frame normally serves as the stop means for the armature movement in both directions, and the impact of the armature particularly at the end of its action stroke has a destructive effect on all parts of the solenoid, shortening its life considerably.

SUMMARY OF THE INVENTION

The present invention provides a complete remotely controllable valve system which solves the problems mentioned above with a compact package using a minimum sized solenoid. Generally stated the system includes a primary valve which directly controls the air flow to and from a servo motor cylinder, and a pilot valve connected to a branch of the main supply line and actuated by a solenoid to supply air to the primary valve and move it to its control positions.

The primary valve has a bore with five lateral ports. The two end ports are connected to branches of the supply line, the adjacent intermediate ports are connected to the ends of the servo motor, and the single central port is open to exhaust. All ports are in communication through the bore but flow is controlled by four ring-shaped valve seats, one between each pair of ports, and by an axially movable shaft carrying four poppet heads to engage the valve seats.

Two alternate valve rings have seats facing a first end of the bore and the other two have seats facing the second end of the bore. The poppets have seats, preferably in the form of annular gaskets, facing the appropriate ring seats. With the shaft at the first end of the bore, for example, the second and fourth poppet heads will engage the second and fourth rings to feed air through the first inlet and outlet ports to a first end of the servo motor and open the other end to exhaust. The first and third heads engage the first and third rings when the shaft moves to the second end of the bore to reverse the flows to and from the servo motor.

If the valve rings were all fixed in position in the bore and the heads were all fixed in position on the shaft, it is obvious that the first and third heads would have to be spaced exactly the same distance apart as the first and third rings with no tolerance at all in order for both to seal perfectly. The same situation is true of the second and fourth head and ring sets. This creates an intolerable manufacturing problem.

This difficulty is completely overcome by the unique valve arrangement employed in the present device. The first and second rings are fixed to each other in an assembly which is slidable a short distance in sealing engagement with the bore, and stop means is formed in the bore to limit travel of the assembly toward the second end. The third and fourth rings form a second identical assembly which is limited in its travel toward the first end. The stops are so spaced that, if both assemblies were abutted against the stops at the same time, the seats of the first and third rings would be closer together than the seats of the first and third heads. The same would be true of the second and fourth head and ring sets. The dimensional difference may be very small, only a little more than manufacturing tolerances, but is preferably about one sixteenth to one eighth inch.

Considering the action only in one direction, if the shaft is at the first end of the bore and is moved toward the second end, the first head will contact its ring and force it solidly against its stop while the third head will contact its ring and push it axially away from its stop. At this time the line pressure is applied to the third ring in a direction to urge it toward the first end of the bore and consequently hold it in firm, sealing engagement with its head. In effect, the ring floats axially to the extent necessary to accommodate the dimensional differences between the heads and the rings. Movement in the opposite direction causes the second and fourth head and ring sets to act in the same way.

The forces necessary to move the shaft would require a rather sizable solenoid. Therefore the valve is formed to be air operated by supporting the shaft at its ends on pistons slidable in the bore and closing the first end of the bore to define an expansible chamber. A port is formed in the closed end wall for entry of air at line pressure from the pilot valve. The first piston, at the first end of the bore, is larger than the second piston, and all of the elements are so sized that when air is admitted to the expansible chamber the shaft is driven to the second end and when air is exhausted the shaft will be driven back to the first end.

The valve head and seat in the pilot valve are much smaller than the various heads and seats in the primary valve and consequently, with the same line pressure, the solenoid may be proportionately smaller. This reduces the cost of the solenoid and results in a very compact package. The pilot valve is so designed that its poppet head is held seated by both air pressure and a spring. The valve seat assembly and the solenoid are both mounted for limited axial sliding movement and the valve seat assembly is held against the solenoid frame by the air pressure and the spring. When the armature moves in its power stroke it opens the valve and then strikes the frame. The impact is reduced by movement of the frame against the yielding resistance of the air and the spring and also by friction of the valve assembly seals sliding in the bore of the valve. On the return stroke the impact of the armature is reduced by contact with a resilient stop. This reduction in impact forces greatly extends the life of the solenoid.

BRIEF DESCRIPTION OF THE DRAWINGS

Various other advantages and features of novelty will become apparent as the description proceeds in conjunction with the accompanying drawings, in which:

FIG. 1 is a schematic elevational view of the valve assembly of the invention connected to a servo motor to be controlled;

FIG. 2 is a schematic view of the assembly of FIG. 1 with the primary valve shown in section and with the poppet shaft at a first limit position;

FIG. 4 is a sectional view of the pilot valve of the invention;

FIG. 5 is a view similar to FIG. 4 showing a modification; and

FIG. 6 is a view, partly in section, taken on line 6—6 of FIG. 5.

DESCRIPTION OF THE PREFERRED EMBODIMENTS

Figure 3:
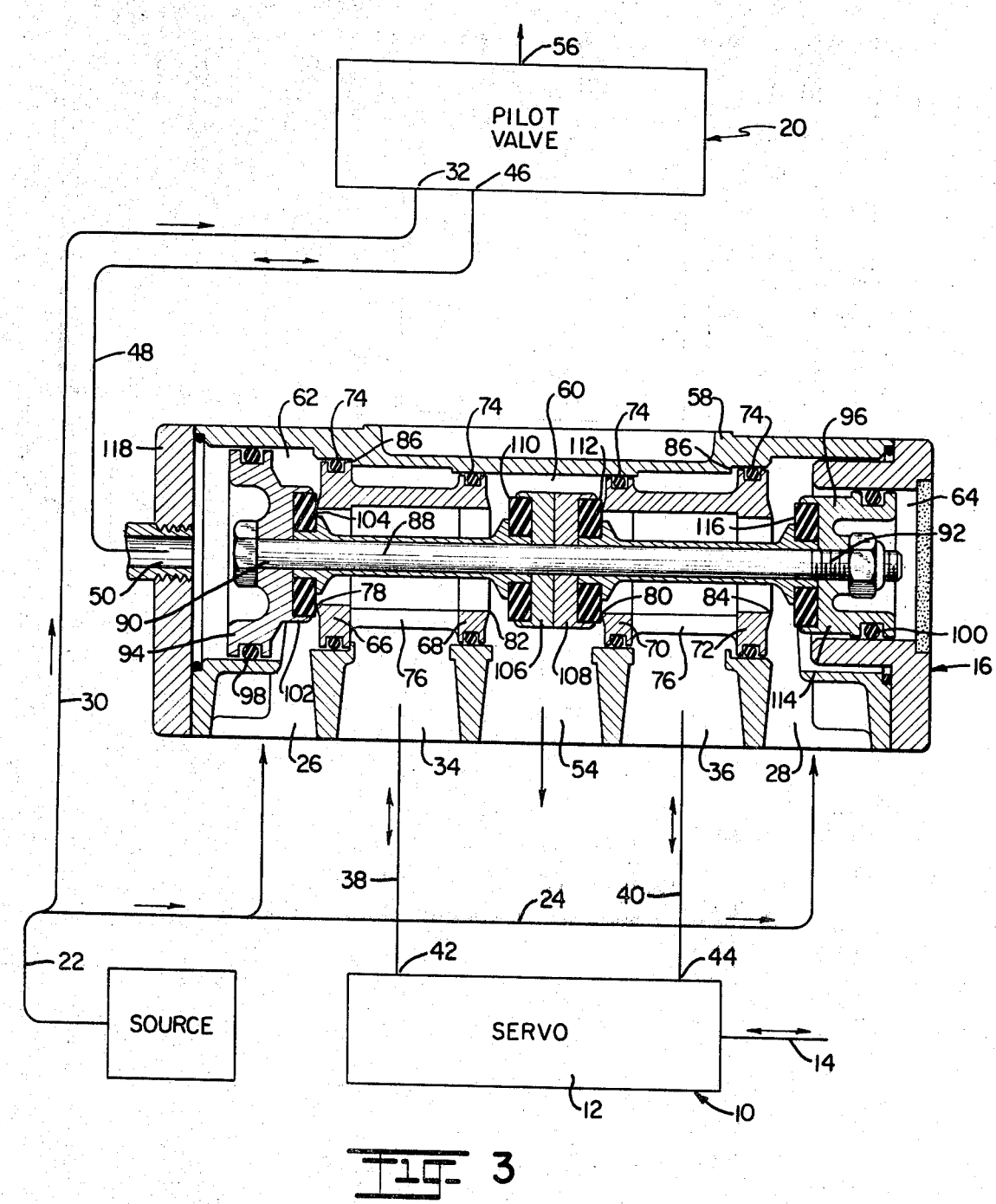
FIG. 3 is a view similar to FIG. 2 with the poppet shaft at its second limit position.

A complete assembly making use of the invention is schematically illustrated in FIG. 1, in which a servo motor 10 includes a cylinder 12 having a piston, not shown, and a piston rod 14. A primary valve 16 is carried on the cylinder by a pedestal 18, and a pilot valve 20 is mounted directly on the primary valve. A conduit 22 delivers pressurized air from a source, not shown, by way of branch 24 to inlet ports 26 and 28 of valve 16 and by way of branch 30 to the inlet port 32 of valve 20. Outlet ports 34 and 36 of the primary valve are connected by conduits 38 and 40 to ports 42 and 44 at the first and second ends of servo cylinder 12. Outlet port 46 of the pilot valve is connected by conduit 48 to the supply or inlet port 50 at the first end of the primary valve. Conductors 52 lead from a source of electric power to a solenoid within valve 20.

As will be explained in detail hereinafter, when the solenoid of valve 20 is actuated, pressurized air flows through conduit 30, valve 20 and conduit 48 to port 50 of the primary valve, causing the flow control means with the valve to move to the second end of the primary valve. When this occurs, pressurized air flows from conduit 24 into the second end of valve 16 and through conduit 40 to the second end of cylinder 12 to retract piston rod 14. At the same time a flow path is opened from the first end of cylinder 12 through conduit 38 into valve 16 and out through exhaust port 54. When the solenoid is deenergized, air flows from port 50 through conduit 48 and the pilot valve and exits to atmosphere through exhaust port 56. This reverses the flow control means within the primary valve to admit air to port 42 and exhaust it from port 44 to extend piston rod 14.

The primary valve 16 is shown in detail in FIGS. 2 and 3. Considering FIG. 2, the valve includes a body 58 having an elongate bore 60 extending throughout substantially the full length of the body and having a first end 62 and a second end 64. The ports previously mentioned all communicate laterally with the bore and comprise first inlet port 26, first outlet port 34, exhaust port 54, second outlet port 36 and second inlet port 28. Valve means are provided between each two adjacent ports to assist in controlling the flow of pressurized air as desired. They take the form of first, second, third, and fourth valve rings 66, 68, 70, and 72 respectively. Each ring is axially slidable in its part of the bore and is in sealing engagement with the wall of the bore by means of O-rings 74. The first and second rings are secured to each other in fixed axially spaced relation by a plurality of small posts 76, and the third and fourth rings are similarly secured, to form first and second valve ring assemblies which are open to air flow axially and laterally.

The first and third rings have slightly axially raised circular seats 78 and 80 at their radially inner margins, and these seats face the first end 62 of the bore. The second and fourth rings have similar seats 82 and 84 facing the second end 64 of the bore. Rings 66 and 72 are slightly larger than rings 68 and 70, and the bore is larger at their zone to accommodate them. Adjacent to rings 66 and 72 the bore is reduced in diameter to form shoulders 86 which serve as stop means to limit the travel of the ring assemblies toward the center of the body.

The other component of the flow control means comprises a shaft 88 coaxially located in the bore and having a first end 90 at the first end of the bore and a second end 92 at the second end of the bore. The shaft is mounted for axial movement by a first, large piston 94 at the first end and a second, smaller piston 96 at the second end, each in sealing engagement with the bore by means of O-rings 98 and 100. Fixedly mounted on the shaft at appropriate positions for engaging the valve rings are four poppet heads. The first head, 102, is in the zone of the first inlet port and is preferably integral with piston 94. It has a seat in the form of an annular flat gasket 104 facing seat 78. The second and third heads 106 and 108 are in the zone of the exhaust port and are provided with similar seats 110 and 112 facing seats 82 and 80 respectively. The fourth head 114 is in the zone of the second inlet port and is preferably integral with piston 96. It is provided with a similar gasket seat 116 facing seat 84. Although the form shown is preferable, it is to be noted that the gaskets may be on the valve rings and the raised edges on the heads. Also both seats of each set may be metallic but this requires more accurate machining work.

With the parts in the position shown in FIG. 2, in which the shaft is at its first limit position, the gasket 116 of head 114 engages seat 84 of ring 72 and forces said ring 72 solidly against its stop means 86. The distance between stop means or shoulders 86 has been so chosen with respect to the axial dimensions of ring assemblies that, if both assemblies were abutting their stops at the same time, the axial distance between the seats 82 and 84 would be slightly less than the axial distance between head seats 110 and 116. Consequently, the gasket 110 of head 106 contacts the seat 82 of ring 68 just before the gasket 116 of head 114 contacts the seat 84 of ring 72 and pushes ring 68 away from its stop means or shoulder 86. However, the seat 82 of ring 68 remains in contact with the gasket 110 of head 106 to block air flow from the inlet port 26 to the exhaust port 54 and creates a pressure differential between line pressure and atmosphere. This differential is applied to ring 68 as an annular piston and is sufficient to hold it very firmly in engagement with head 106. Therefore full line pressure enters port 26 and passes through port 34 to the first end of cylinder 12 to extend piston rod 14. At the same time, line pressure is cut off from port 36 by ring 72 and head 114, and the second end of cylinder 12 is flow connected to atmosphere by port 36 and exhaust port 54.

Reference to FIG. 3 will show that, when shaft 88 has moved to its second limit position, the situation described above will be reversed and the modified air flows will cause the piston rod 14 to move to the left as viewed in FIGS. 2 and 3. At this time, the gasket 104 of head 102 engages the seat 78 of ring 76 thereby pressing or urging ring 66 against its stop 86 and the gasket 112 of head 108 engages the seat 80 of ring 70 thereby pushing ring 70 away from its stop 86, and the pressure differential between port 36 and exhaust port 54 urges ring 70 into firm engagement with the head 108.

To move shaft 88 from the first position of FIG. 2 to the second position of FIG. 3, pilot valve 20 is actuated to apply full line pressure through conduit 48 to the exposed face of piston 94. The piston, together with the wall of the bore and the end wall 118, forms an expansible motor chamber. The force urging shaft 88 toward the second position comprises line pressure on the full face of piston 94, on the face of ring 68, on the area of head 106 radially inward of seat 82 less shaft 88, and on the area of piston 96 radially outward of seat 84. The force resisting this movement comprises line pressure on the area of piston 94 less shaft 88, and on the area of ring 72. The net result is a very substantial force to drive the shaft to its second limit position.

To move shaft 88 from the second position to the first position, valve 20 is deactivated to exhaust air from the expansible chamber. The force urging shaft 88 toward the first position comprises line pressure on the area of piston 94 radially outward of seat 78, on the area of ring 70, and on the area of head 108 radially inward of seat 80 less shaft 88. The force resisting this movement comprises line pressure the area of piston 96 less shaft 88. Again, the result is a very substantial force to drive the shaft to the first limit position.

While the entire assembly is shown in FIG. 1 as a unitary package, the primary valve may be mounted separately and connected to the servo motor with longer conduits. Also, the pilot valve need not be mounted directly on the primary valve but may be separately mounted at any desired distance.

Pilot valve 20, as shown in FIG. 4, includes a main body member 120 provided with inlet port 32, outlet port 46 leading to the primary valve, and exhaust port 56, all communicating laterally with bore 122 which constitutes a valve chamber. A solenoid assembly 124 is mounted for limited longitudinal movement in solenoid chamber 126 which is partly in body 120 and partly in cap 128. The solenoid chamber is in generally open communication with the first end of the valve chamber and in axial alignment therewith.

A hollow valve seat assembly 130 is mounted in the intermediate portion of the valve chamber and comprises two spoollike sections 132 and 134 secured together with a transverse seal 136 between them. The outer margin of the seal engages the wall of the valve chamber to seal the seat assembly between outlet port 46 and exhaust port 56, and its inner margin constitutes a valve seat 138 which is also located axially between ports 46 and 56. Section 132 has a radially inward flange which serves as a facewise valve seat 140 and is located axially between inlet port 32 and outlet port 46. Section 132 is provided with radial apertures 142 for flow communication with port 46, and section 134 is provided with radial apertures 144 for flow communication with port 56. A spacer block 146 is slidably located between the valve seat assembly and the adjacent end of the solenoid frame 148.

A valve member 150 is mounted for axial movement in the valve chamber and comprises a head 152 in the inlet port and a stem 154 which extends through the valve seat assembly with its free end in the solenoid chamber. Head 152 carries a guide sleeve 156 slidably mounted in a guide channel 158 formed in the body. A cap 160 on the end of the body bears a projection 162, and a spring 164 mounted in the guide sleeve abuts against the projection and against the valve head to urge the head toward the first end of the valve chamber and into engagement with valve seat 140. A seal 166 prevents leakage of high pressure air from the inlet port into the guide channel and cap. An axial passage 168 through the valve head and stem provides a flow path to atmosphere for air compressed in the guide channel and cap by opening movement of valve member 150. It will be understood that axial passage 168 may be omitted if a suitable opening were formed either in the cap 160 or the body 120 to permit venting of the guide channel 158 to the atmosphere.

In the position shown, valve head 152 is in contact with seat 140 to prevent passage of pressurized air from inlet port 32. A cylindrical boss 170 on stem 154 constitutes a second valve head to block passage between ports 46 and 56. It is so located on the stem that it is slightly spaced axially from seat 138 toward the first end of the valve chamber. When the valve member is moved to open position for flow between ports 32 and 46, boss 170 enters seat 138 to engage it radially and cutoff port 46 from port 56.

The solenoid assembly includes the frame 148, a coil 172 having leads 174 for connection to a source of electric power, and an armature 176 having a cross head 178. The assembly is slidably mounted in chamber 126 for axial movement to the extent of gap 180. With the construction shown, both the spring 164 and the air pressure on valve head 152 in its closed position yieldingly urge the valve seat assembly 130 toward the first end of the valve chamber and into contact with spacer block 146. The spacer block in turn contacts the solenoid assembly 124 to move the frame 148 into contact with shoulder 182 in cap 128. Thus the valve components are always in the proper relation to the solenoid components regardless of manufacturing tolerances in the body and caps.

When the coil of the solenoid is energized, it drives the armature toward the valve chamber. The forward end of the armature strikes the free end of the valve stem and moves it toward the second end of the valve chamber against the force of the spring 164, opening a flow path from inlet port 32 to outlet port 46 to actuate the primary valve. At the same time boss 170 axially enters seat 138 and engages it radially to prevent flow to the exhaust port 56. This action also results in maintaining line pressure against the valve seat assembly toward the first end of the valve chamber. When the armature completes its stroke against valve stem 154, the crosshead 178 strikes the solenoid frame 148. In prior constructions the impact of the sudden stoppage was very severe and solenoid life was short. However, in the present construction, the impact of the armature drives the frame forward across gap 180 against the resistance of line pressure and spring 164 acting on the valve seat assembly. This yielding resistance plus the friction resistance of the seals on the wall of the valve chamber drastically reduces the impact effect and greatly prolongs solenoid life.

Although the return stroke is much less severe, it is desirable to reduce its impact effect also. To this end, cap 128 is made of strong resilient plastic material. When the frame returns, it strikes shoulder 182, and when the armature returns, the crosshead 178 strikes cylindrical boss 184, and the resilient material greatly cushions the shock.

A slightly modified form of the pilot valve is illustrated in FIGS. 5 and 6. In this form, the main body 186 has a closed end to eliminate an extra cap. Ports 32, 46, and 56 are arranged differently in a radial sense but have the same relative axial location. The valve member 150 and valve seat assembly are the same and function in the same way. Spacer block 146 contacts an additional spacer member 188 on the end of solenoid frame 190. Coil 192 is carried laterally of the solenoid frame. The armature 194 has a crosshead 196 which engages end 198 of the solenoid at the end of its power stroke.

The cap 200 of this solenoid is a metallic member which does not have cushioning properties. Therefore, it is provided with a separate shoe 202 of strong resilient plastic material, best seen in FIG. 6. This shoe has a shoulder 204 to receive and cushion the impact of the solenoid frame and a cylindrical boss 206 to receive and cushion the impact of the armature on their return stroke.

It will be apparent to those skilled in the art that various changes in the construction and arrangement of parts of the valve system as disclosed may be made without departing from the spirit of the invention, and it is intended that all such changes shall be embraced within the scope of the following claims.

I claim:

1. A remotely controllable valve system for controlling the supply of pressurized air to opposite ends of the cylinder of a servo motor to actuate the piston of the servo motor in opposite directions, comprising: a primary valve; a pilot valve; and a single source of pressurized air having branched conduit means to supply air to both of said valves; said primary valve being directly flow-connected to said conduit means and to said servo motor and being provided with passage means to supply pressurized air to and exhaust air from both ends of said cylinder; said primary valve being further provided with air-actuated means to selectively control and direct the flow of air from said conduit means to each end of said cylinder; said pilot valve being directly flow-connected to said conduit means and to the flow control means of said primary valve and being provided with passage means to supply pressurized air to and exhaust air from said primary valve to cause selective operation of the flow control means of said primary valve; said pilot valve being further provided with flow control means for the air passages therein and with solenoid means to selectively actuate said last mentioned flow control means.

2. A pilot valve for use in a remotely controllable valve system, comprising: a body containing a solenoid chamber and a valve chamber in axial alignment with each other, with a first end of said valve chamber adjacent to the solenoid chamber and a second end remote therefrom; a first port in the second end of the valve chamber adapted for flow-connection to a source of pressurized air; a second port in an intermediate portion of the valve chamber adapted for flow-connection to a primary valve to deliver air thereto and receive air therefrom;

and a third port between the second port and the first end of said valve chamber to receive air from the second port and exhaust it to atmosphere; a hollow valve seat assembly mounted in the intermediate portion of the valve chamber in sealing relation therewith and provided with a first radially inwardly extending valve seat located between said first and second ports and a second radially inwardly extending valve seat located between said second and third ports; said assembly having radial apertures in its wall for flow communication with said second and third ports; a valve member mounted in the valve chamber for axial movement and having a head in the first end of the chamber and a stem extending axially through the valve seat assembly with its free end in the solenoid chamber; spring means to urge the valve member toward the solenoid chamber and the valve head into sealing engagement with the first valve seat to block the flow of pressurized air to the second port; a cylindrical boss on said stem adapted to radially engage and seal said second valve seat when the valve head is retracted from the first valve seat to block communication between the second and third ports; said boss being so located on said stem as to be spaced axially from said second valve seat a short distance toward the first end of the valve chamber when the valve head engages the first valve seat; and a solenoid assembly comprising a frame, a coil and an armature located in said solenoid chamber; the armature being adapted, upon actuation of the coil, to move axially and strike the free end of said valve stem to unseat the valve head for flow of pressurized air to the second port and to seat the valve boss to block the flow of air from the second port to the third port.

3. A pilot valve as claimed in claim 2, said valve seat assembly being axially slidably mounted in the valve chamber and being constantly urged into endwise engagement with the frame of the solenoid assembly by the spring means acting on the valve head and by the air pressure in the second end of the valve chamber to insure predetermined dimensional relationships between the valve elements and the solenoid elements despite manufacturing tolerances in the valve body.

4. A pilot valve as claimed in claim 3, the solenoid assembly being mounted for slight axial movement against the spring and air pressure in the valve chamber to reduce the impact force of the armature striking the solenoid frame.

5. A pilot valve as claimed in claim 4, the valve seat assembly being provided with sealing rings in sliding frictional engagement with the wall of the valve chamber to absorb a portion of the impact energy of the armature striking the solenoid frame.

6. A pilot valve as claimed in claim 4, at least a portion of the end of the solenoid chamber remote from the valve chamber being formed of resilient material to serve as impact-reducing stop means for the armature and frame at the end of their return stroke.

7. A valve for controlling the supply of pressurized air to opposite ends of the cylinder of a servo motor to actuate the piston of the servo motor in opposite directions, comprising: a valve body having an elongate bore therein; a first inlet port at a first end of said bore and a second inlet port at the second end of said bore; said ports being connected to a source of pressurized air; a first outlet port adjacent to the first inlet port and located between said first inlet port and the intermediate portion of the bore; a second outlet port adjacent to the second inlet port and located between the second inlet port and the intermediate portion of the bore; said outlet ports being adapted for connection to the opposite ends of the cylinder of a servo motor to supply air to and exhaust air from the cylinder; an exhaust port located at the intermediate portion of the bore between and adjacent to the outlet ports and adapted to exhaust air from each of them to atmosphere; a first annular valve ring in the bore between the first inlet port and the first outlet port, and a second annular valve ring in the bore between the first outlet port and the exhaust port; said rings being secured to each other in fixed axially spaced and communicating relation and mounted for axial sliding movement in the bore, and being in sealing engagement with the wall of the bore; said first ring having a valve seat facing the first end of the bore, and said second ring having a valve seat facing the second end of the bore; a third annular valve ring in the bore between the exhaust port and the second outlet port, and a fourth annular valve ring in the bore between the second outlet port and the second inlet port; said third and fourth rings being secured to each other in fixed axially spaced and communicating relation and mounted for axial sliding movement in the bore, and being in sealing engagement with the wall of the being said third ring having a valve seat facing the first end of the bore, and said fourth ring having a valve seat facing the second end of the bore; a shaft mounted coaxially in the bore for longitudinal movement therein; a first valve head fixed on the shaft in the zone of the first inlet port and having a seat facing the first ring; a second valve head fixed on the shaft in the zone of the exhaust port and having a seat facing the second ring; a third valve head fixed on the shaft in the zone of the exhaust port and having a seat facing the third ring; and a fourth valve head fixed on the shaft in the zone of the second inlet port and having a seat facing the fourth ring; the seats on each head and ring set being so constructed and arranged to engage each other in sealing relation along a circular line of contact spaced radially inward from the wall of the bore; stop means on said body to limit the travel of the first and second rings toward the second end of the bore, and stop means to limit the travel of the third and fourth rings toward the first end of the bore; the spacing of the stop means on said body, the rings, and the heads being so constructed that, when the shaft is moved to its extreme position toward the first end of the bore, the fourth head will engage the fourth ring and force it into engagement with its stop means and the second head will engage the second ring and move it away from its stop means; the engagement between said second head and second ring blocking the flow path between the first outlet port and the exhaust port to create a differential air pressure on the second ring and hold it in sealing engagement with the second head.

8. A valve as claimed in claim 7, the seat on each valve ring comprising an axially raised annular edge extending around the radially inner margin of the ring; and the seat on each valve head comprising a generally planar annular pad of yieldable material adapted to contact the ring seat in a plane transverse to the axis of the bore.

9. A valve as claimed in claim 7, said first and fourth rings being of larger diameter than said second and third rings; said bore being of increased diameter adjacent to said first and fourth rings, thereby forming annular shoulders serving as said stop means.

10. A valve as claimed in claim 7, the mounting for said shaft comprising a first piston fixed on a first end of the shaft and slidable in sealing engagement with the first end of the bore, and a second piston fixed on the second end of the shaft and slidable in sealing engagement with the second end of the bore.

11. A valve as claimed in claim 10, said first piston being of larger diameter than said second piston; the first end of the bore having a closed end wall forming with the bore and first piston an expansible chamber and having an entry port for pressurized air; and the second end of the bore being open to atmosphere; the force of the pressurized air in the expansion chamber acting on the first piston being sufficient to cause the shaft to move toward the second end of the bore.

12. A valve as claimed in claim 11, the diameters of the pistons, rings, and heads being such that, when the shaft is at the second end of the bore and pressurized air is exhausted from the expansible chamber, the net effect of the pressurized air in the bore on the pistons, rings, and heads exposed to such pressure is a force sufficient to move the shaft back to the first end of the bore.

13. A valve comprising: a body having a bore therein with a first end and a second end;
   a shaft concentric with said bore and axially movable therein toward each of said ends;

a first valve head fixed on a first end of said shaft adjacent to the first end of said bore;

second and third valve heads fixed on said shaft intermediate its length;

a fourth valve head fixed on the second end of said shaft adjacent to the second end of said bore;

first and second valve rings fixed to each other and communicating to form a first ring assembly slidably mounted in said bore between the first and second heads;

third and fourth valve rings fixed to each other and communicating to form a second ring assembly slidably mounted in said bore between the third and fourth heads;

said first head and ring set and said third head and ring set being constructed to contact in sealing relation upon movement of the shaft toward the second end of said bore, and said second head and ring set and said fourth head and ring set being constructed to contact in sealing relation upon movement of the shaft toward the first end of said bore;

stop means on said body to limit the travel of the first ring assembly toward the second end of the bore;

stop means on said body to limit the travel of the second ring assembly toward the first end of the bore; the stop means being so arranged that, when both ring assemblies abut the stop means, the distance between the contact faces of the first and third rings will be slightly less than the distance between the contact faces of the first and third heads, and the distance between the contact faces of the second and fourth rings will be slightly less than the distance between the contact faces of the first and third heads, and the distance between the contact faces of the second and fourth rings will be slightly less than the distance between the contact faces of the second and fourth heads;

said distance differential serving, when the shaft is moved toward the second end of the bore, to cause the first head to contact the first ring to solidly abut its stop means and to cause the third head to contact the third ring and move it away from its stop means so that both head and ring sets will engage accurately in sealing contact;

said third ring being yieldably urged toward said third head to maintain positive sealing contact;

said distance differential serving to produce the same sealing contact between the second and fourth head and ring sets upon movement of the shaft toward the first end of the bore.

14. A valve comprising:

a body having a bore therein with a first end and a second end; a shaft within said bore and axially movable therein toward each of said ends;

a first valve head fixed on a first end of said shaft adjacent to the first end of said bore, and a second valve head fixed on said shaft;

a first valve ring in said bore adjacent to said first head, and a second valve ring in said bore adjacent to said second head;

said heads having valve seats facing toward the second end of said bore and said rings having valve seats facing toward the first end of said bore; said rings being slidably mounted in said bore;

and stop means on said body to limit the travel of said first ring toward the second end of said bore;

movement of said shaft toward the second end of said bore causing said first head to engage said first ring and force it against its stop means and causing said second head to engage said second ring and move it toward the second end of said bore;

said second ring being subject to an air pressure differential to yieldingly hold it in sealing engagement with said second head.

15. A valve as claimed in claim 14 including a piston affixed to said shaft and slidable in a cylinder, said piston adapted to move said shaft in one direction in response to increase in pressure in said cylinder, and to permit movement of said shaft in the opposite direction in response to decay of pressure therein.

16. A valve as claimed in claim 14 including a second piston affixed to said shaft and slidable in a cylinder communicating with the atmosphere.